(12) United States Patent
Fagerburg

(10) Patent No.: US 6,265,072 B1
(45) Date of Patent: Jul. 24, 2001

(54) UV-STABILIZED POLYMERIC STRUCTURES

(75) Inventor: David Richard Fagerburg, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/300,201

(22) Filed: Apr. 27, 1999

(51) Int. Cl.$^7$ ...................................................... B32B 27/36
(52) U.S. Cl. ........................................... 428/412; 428/913
(58) Field of Search ..................................... 428/412, 913

(56) References Cited

U.S. PATENT DOCUMENTS

| | | |
|---|---|---|
| 2,465,319 | 3/1949 | Whinfield et al. . |
| 3,047,539 | 7/1962 | Pengilly . |
| 4,446,262 | 5/1984 | Okumura et al. . |
| 5,264,539 | 11/1993 | Shepherd . |
| 5,480,926 | 1/1996 | Fagerburg et al. . |
| 5,558,912 | 9/1996 | Fagerburg et al. . |
| 5,709,929 | 1/1998 | Venema . |
| 5,783,307 | 7/1998 | Fagerburg et al. . |
| 5,846,659 | 12/1998 | Aktiengesellschaft . |
| 5,856,553 | 1/1999 | Walker et al. . |

OTHER PUBLICATIONS

U.S. Application No. 08/996,597, Darnell et al., filed Dec. 23, 1997.
U.S. Application No. 08/997,432, Walker et al., filed Dec. 23, 1997.
Database WPI, Section Ch, Derwent Publications Ltd., London, GB; Class AN 1968–25207Q, XP002144529 & CA 807 072 A (Union Carbide Corp).

*Primary Examiner*—Duc Truong
(74) *Attorney, Agent, or Firm*—Cheryl J. Tubach; Bernard J. Graves, Jr.

(57) ABSTRACT

Weatherable multi-layer structures that are ultraviolet stabilized contain a substrate layer of a polymer which degrades upon exposure to UV radiation and at least one ultraviolet protective layer based on a 2,2,4,4-tetramethyl-1,3-cyclobutanediol-based polycarbonate and an effective level of an ultraviolet absorbing compound. The UV absorbing compound is a benzotriazole, a dimeric benzotriazole, a triazine, a benzoxazinone, or a diphenylcyanoarylate.

27 Claims, No Drawings

UV-STABILIZED POLYMERIC STRUCTURES

TECHNICAL FIELD OF THE INVENTION

This invention relates to ultraviolet (UV)-stabilized structures that are based on polymeric substrates that are otherwise degraded by UV radiation, such as polyesters, polycarbonates, polyvinyl chloride and copolymers thereof. More particularly, this invention relates to such structures having UV protective layers that contain particular aliphatic glycol-based polycarbonates and UV absorbing compounds.

BACKGROUND OF THE INVENTION

Many polymers are not very stable to the effects of ultraviolet (UV) radiation. Exposure to UV radiation over extended periods of time causes hazing, property loss and yellowing. This lack of property stability upon exposure to UV radiation has long limited the uses of these materials in outdoor environments.

The addition of UV absorbing compounds, sometimes called UV stabilizers, are used to retard the loss of properties and particularly the development of yellow coloration in UV unstable polymers when exposed to UV radiation. The UV absorbing compounds must have an extinction coefficient significantly higher than that of the polymers to be stabilized such that almost all of the incident UV radiation is absorbed by the compounds rather than the polymers. The energy absorbed by the UV absorbing compounds is harmlessly transferred to the polymers as heat rather than transferred electronically to the polymer chains. The fragmentation of the chains is thereby suppressed and the properties of the polymers are retained for a longer time of exposure. Thus, UV unstable polymers that are protected by UV absorbing compounds may be used in applications that have exposure to UV radiation.

The UV unstable polymers protected with UV absorbing compounds are typically used in sheet or extruded profile form. Sheeting or profiles made from clear, colored or pigmented polymers are advantageously employed in a great number of outdoor applications when they have sufficient color stability, mechanical property retention and thermoformability. The back side of the sheeting or profile may also be printed on or have a decorated sheet adhered thereto. Representative applications include signs and marquees; vehicle luggage carriers; solar roof panels; skylights; highway sound barriers; greenhouse panels; aquarium walls; parts for motor and recreational vehicles such as windows, roofs, body panels, bug and air deflection screens and vents; transparent or translucent awnings; formed letters for application to buildings; airport runway marker signs; multi-wall sheeting for use in signs; facia for soft drink and juice dispensing machines; and siding for houses.

For economic reasons, the UV stabilized polymers are typically made into multi-layer structures having a UV protective layer, which is exposed to UV radiation, and an underlying substrate layer of the polymer, which is protected from the effects of UV radiation solely by the screening of harmful UV light by means of the UV protective layer. In current commercial practice, the UV protective layer contains a UV absorbing compound and a polymeric base material, which is chosen depending on the end use. Typical polymeric base materials include polyesters, polycarbonates and acrylics. The substrate layer is typically a polyester, polycarbonate, polyvinyl chloride polymer or copolymer, chlorinated polyvinylchloride, polyamide, polyetherimide or polyethersulfone. The UV protective layer is typically either laminated or co-extruded onto the substrate layer. The UV protective layer performs its protective function as a relatively thin film as compared to the substrate layer, thereby providing cost reduction by reducing the amount of UV absorbing compound needed.

The UV stabilized structures may be sheets, films, profiles, or hollow profiles depending on the final use of the UV stabilized structures. The hollow profiles are typically made by connecting two or more sheets with ribbings running the length of the sheeting. The ribbings are spaced so as to provide structural stiffness to the final structures that would otherwise not be present. The ribbings make continuous channels down the length of the structure.

In the past, there have been a number of strategies evolved to address the problems associated with UV protection. These strategies fall into two broad categories: 1) use of a UV protective layer of acrylic-based polymer containing a UV absorbing compound to protect the underlying polymeric material, and 2) use of a UV absorbing compound incorporated directly into the polymeric material, usually at a high loading and then applied in a thin layer on the surface of the underlying polymeric material.

This first category of using a protective acrylic layer usually, but not always, overcomes the deficiency of instability toward weathering of the underlying polymeric material by means of screening harmful UV radiation from the underlying polymeric material and thereby diminishing any eventual yellowing and property loss from absorbed ultraviolet light. The major problem with such an approach is the lack of a suitable technology for making a construction with this UV protective layer, which is both economical and durable over long periods of time. Because of the vast differences in rheology of the underlying polymeric material usually employed in this case from that of the acrylic material, co-extrusion is not a good option. Therefore, frequently such constructions are made, in the case of sheeting, for example, by the process of extrusion lamination. This process involves the lamination of a film of the acrylic material onto the polymeric substrate during its extrusion and tends to be more costly than a co-extrusion process, which can be used in the second category mentioned above with a heavily loaded UV layer as the co-extrusion layer. Quite often, however, the economics of the process are only part of the problem. Often a major problem with this laminated film approach is one of eventual delamination of the construction, especially in the conditions of high humidity and heat. This renders the construction totally unfit for use when such delamination occurs.

An additional problem that often overrides all of those mentioned above, is that the acrylic materials tend to be brittle by themselves and therefore tend to reduce the impact properties of the resultant laminate. This means that even the initial sheeting thus produced tends to have dramatically lowered impact resistance as compared to sheeting not having the acrylic-based UV protective layer.

The second category, that of using an UV absorbing compound incorporated directly into the polymeric material, is disclosed, for example in U.S. Pat. Nos. 5,480,926, 5,558,912, and 5,709,929. In U.S. Pat. No. 5,709,929, a multi-layered polyester sheet is produced wherein all of the layers are of the same composition, and one of the surface layers also contains a UV absorbing compound. U.S. Pat. Nos. 5,480,926 and 5,558,912 disclose the use of high levels of UV absorbing compounds in polyesters or co-polyesters in co-extrusion or solvent coated constructions. These references, however, specifically teach that only benzoxazinones are suitable UV absorbing compounds to effect not only protection of the polyester or copolyester from discoloration but also loss of impact during the weathering process. It is specifically taught that a benzotriazole-based UV absorbing compound, 2-(-2'-hydroxy-5'-t-octylphenyl) benzotriazole, was ineffective in retention of impact strength. U.S. Pat. No. 5,783,307 discloses a multi-layered polyester sheet wherein the layer containing the UV absorbing compound also contains an optical brightener to aid in detection of the layer.

The second category of direct incorporation of the UV absorber into the polymeric matrix to be protected has the deficiency that UV light is still able to damage the polymer matrix in which the UV absorbing compound is present, as the UV absorbing compound cannot preferentially absorb 100% of the incident light. That portion of the UV light not absorbed by the UV absorbing compound, even through it may be in a tiny fraction, over long exposure times contributes to damage of the polymeric matrix material in the form of eventual discoloration, usually yellowing, and also property loss, such as eventual loss of ductility in the event of an impact.

Thus, a construction is needed where the above-named deficiencies are overcome, where the UV protective layer is itself stable to the effects of weathering, unlike where the heavily loaded polyester or polycarbonate is the UV protective layer, while at the same time it can be made into a structure with long-term integrity. This structure also needs to have impact properties that are not reduced by the presence of the UV protective layer unlike what is seen with constructions having an acrylic layer as the UV protective layer

SUMMARY OF THE INVENTION

An ultraviolet stabilized structure comprises an ultraviolet (UV) protective layer and a substrate layer of a polymer which degrades upon exposure to ultraviolet radiation. The UV protective layer comprises a 2,2,4,4-tetramethyl-1,3-cyclobutanediol-based polycarbonate and an ultraviolet absorbing compound selected from a benzotriazole, a dimeric benzotriazole, a triazine, a benzoxazinone, and a diphenylcyanoacrylate. The substrate layer is preferably a polyester, polycarbonate, polyvinyl chloride polymer or copolymer, chlorinated polyvinylchloride, polyamide, polyetherimide or polyethersulfone.

DETAILED DESCRIPTION OF THE INVENTION

Weathering resistant, ultraviolet-stabilized structures of the present invention are made using a UV protective layer over a substrate layer or construction. The UV protective layer is a 2,2,4,4-tetramethyl-1,3-cyclobutanediol-based polycarbonate containing an effective amount of a UV absorbing compound. The substrate layer comprises a polymer which degrades upon exposure to UV radiation. The UV absorbing compound and its level are chosen in order to provide adequate protection for the substrate layer underlying the UV protective layer.

The UV protective layer comprises the 2,2,4,4-tetramethyl-1,3-cyclobutanediol-based polycarbonate as the polymer matrix for supporting the UV absorbing compound. This use of the 2,2,4,4-tetramethyl-1,3-cyclobutanediol to modify the polycarbonate allows for preparation of a high molecular weight polycarbonate. In addition, the 2,2,4,4-tetramethyl-1,3-cyclobutanediol-based polycarbonate is itself stable to UV radiation, thus, overcoming the problems of the prior art. As discussed above for prior art structures, the polymer matrix in the UV protective layer if made of certain polymers degraded upon exposure to UV radiation resulting in eventual yellowing of the UV protective layer.

Preferably, the 2,2,4,4-tetramethyl-1,3-cyclobutanediol-based polycarbonate comprises an acid component of 100 mole percent carbonic acid residues and a diol component of at least about 70 mole percent, more preferably at least about 80 mole percent, of 2,2,4,4-tetramethyl-1,3-cyclobutanediol, based on 100 mole percent acid component and 100 mole percent diol component. The diol component may contain modifying glycols present in amounts of up to about 30 mole percent, more preferably up to 20 mole percent. The modifying glycols preferably contain at least 4 carbon atoms. More preferably, the modifying glycols are cycloaliphatic. The most preferred modifying glycols are 1,4-cyclohexanedimethanol and 2,2-dimethyl-1,3-propanediol.

Cis- and trans-isomers exist for both 2,2,4,4-tetramethyl-1,3-cyclobutanediol and 1,4-cyclohexanedimethanol. Generally, either the cis- or the trans-isomer can be employed, as well as mixtures of both, in preparation of the 2,2,4,4-tetramethyl-1,3-cyclobutanediol-based polycarbonate. A mixture of from about 40% to about 80% cis-isomer is especially advantageous to enable a lower melting temperature for the resultant polymer.

Methods of preparing polycarbonates are well known in the art. Preferably, the 2,2,4,4-tetramethyl-1,3-cyclobutanediol-based polycarbonate use in the present invention is prepared according to U.S. Pat. No. 5,856,553 and U.S. Ser. Nos. 08/996,597 filed Dec. 23, 1997 and 08/997,432 filed Dec. 23, 1997. These references describe a method in which bulk dimethylcarbonate is reacted with 2,2,4,4-tetramethyl-1,3-cyclobutanediol to form the bis (methyl carbonate) and a methyl alcohol by-product. This reaction product is then further reacted under basic catalyst conditions to give the 2,2,4,4-tetramethyl-1,3-cyclobutanediol-based polycarbonate. In addition, the modifying glycols can be added during this synthesis and become part of the polycarbonate chain.

UV absorbing compounds that are compatible with the 2,2,4,4-tetramethyl-1,3,-cyclobutanediol-based polycarbonate in the UV protective layer are of several classes: 1) benzotriazoles, where the phenolic residue of said benzotriazole contains at least a methyl group and more preferably contains a higher alkyl group than methyl to enable a lower vapor pressure at temperatures of the melt of the aliphatic glycol-based polycarbonate, 2) dimeric benzotriazoles where there is a —$CH_2$— linkage between the phenolic rings of two molecules of a benzotriazole, 3) triazines which are substituted on all three carbon atoms of the triazine ring with up to three phenolic groups such as described for the benzotriazoles, the remainder of the carbons being substituted with aryl groups with or without alkyl substitution on them but containing no phenolic hydroxyl groups, and 4) benzoxazinones with an aromatic ring between two benzoxazinone rings that may or may not be substituted with alkyl or halogen substituents. These substituents can be on the aromatic ring between the two benzoxazinone rings or more preferably on the benzoxazinone rings themselves, and 5) diphenylcyanoacrylate.

Suitable benzotriazole compounds, for use as UV absorbing compounds, are characterized by the following structure:

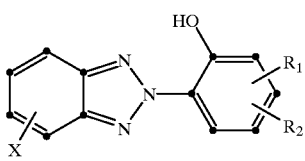

I wherein X is an alkyl or aryl substituent or a halogen atom such as chlorine and $R_1$ and $R_2$ are alkyl or aryl groups of from 1 to 20 carbon atoms or either one may be hydrogen. These groups may be located in any desired substitution pattern on the ring but are usually ortho- and/or para- to the hydroxyl group.

Benzotriazoles are also known to be prepared as essentially dimers of the compounds in Structure I in order to reduce their volatility in the sheet manufacturing process. Such compounds are represented by the following structure:

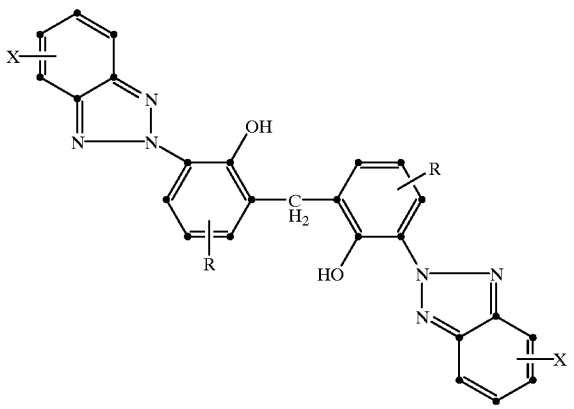

II wherein X and R have the same definition as for X and $R_1$ $R_2$, respectively, in Structure I, except that R may not be hydrogen. The R group may be located at will on the ring but is usually located para- to the hydroxyl grouping for greatest synthetic ease.

A representative structure of the class of triazine compounds suitable as UV absorbing compounds in the present invention is as follows:

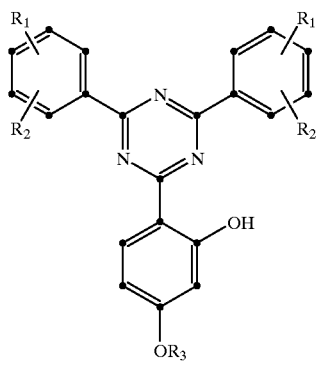

III wherein $R_1$, $R_2$ and $R_3$ are an alkyl or aryl group. Their position of substitution on the rings may be as desired but is generally ortho- and para- to the bond to the triazine ring for best synthetic ease. One or both of the two groups $R_1$ or $R_2$ may be hydrogen. The $R_2$ group of either or both of these aromatic rings can be an OH group located ortho to the carbon attached to the triazine ring. In such case, $R_1$ is preferably the same description as the $OR_3$ grouping.

One such commercially available material, suitable for use in the present invention, is sold under the trade name Mixxim BB-100 from Fairmont Chemical Company of Newark, N.J. Benzotriazoles and triazines are surprisingly useful as UV absorbing compounds in the practice of this invention in light of the teaching of previous patents (described hereinabove). Benzotriazoles are specifically taught to be ineffective in the stabilization of polyesters and copolyesters to impact loss.

Suitable benzoxazinones include those disclosed in U.S. Pat. No. 4,446,262 and U.S. Pat. No. 5,264,539. These benzoxazinone absorbing compounds are characterized by the following structure:

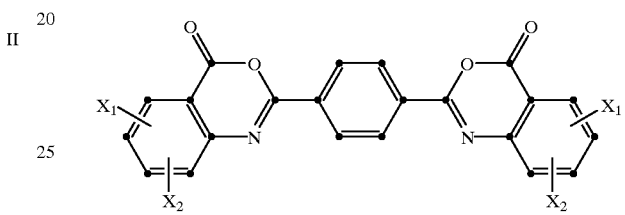

IV wherein $X_1$ and $X_2$ may be chosen from, but not limited to, the following functional groups: alkyl, aryl, heteroaryl, halo, alkoxy, aryloxy, hydroxy, carboxy, ester and nitro. $X_1$ and $X_2$ may also be hydrogen. Thus, more than one functional group may be present on the benzoxazinone ring system itself. Where multiple functional groups are present they may be the same group or different groups. Additional benzoxazinone structures that are considered useful for stabilization of polyesters and polycarbonates against the harmful effects of outdoor weathering are given in U.S. Pat. No. 4,446,262 and U.S. Pat. No. 5,264,539.

One such commercially available material, suitable for use in the present invention, is sold under the trade name Cyasorb 3638 from Cytec Industries.

Suitable diphenylcyanoacrylates include those having the representative structure as follows:

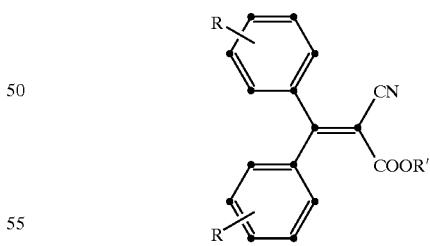

V wherein R is an alkyl or aryl group of from 1 to 20 carbons. Also R may contain a functional group such as carbomethoxy, hydroxy or an acid group or an ester group wherein the alcohol in the ester portion may be from 1 to 20 carbon atoms. R' is an alkyl group of from 1 to 20 carbons. The alkyl groups referred to for both R and R' may be either linear or branched.

Appropriate levels of the UV absorbing compound to be placed in the UV protective layer can vary widely from application to application and from UV absorbing compound to UV absorbing compound. In general, however, the level of the UV absorbing compound should preferably not be below about 0.25 weight percent (wt. %) and should more preferably be at the level of about 0.5 wt. % or above. Above about 5 wt. % of the UV absorbing compound, the benefits of additional UV absorbing compound are greatly diminished; and so for that reason and for reasons of economics, such levels are to be avoided. These weight percents are based on the total weight of the UV absorbing compound and 2,2,4,4-tetramethyl-1,3,-cyclobutanediol-based polycarbonate. Enough UV absorbing compound must be present in the total light path before coming to the substrate layer that at least 99% of the light must be absorbed in the damaging UV region. More preferably at least 99.5% and most preferably 99.9% and above of the damaging UV light should be absorbed by the UV protective layer.

The substrate layer of the present invention comprises a polymer which degrades upon exposure to ultraviolet radiation. That is, the polymer exhibits unacceptable changes in coloration or physical properties, such as yellowing or loss of impact strength, caused by the exposure of the polymer to ultraviolet radiation. Suitable polymers of this type include polyesters, polycarbonates, polyvinyl chloride polymer or copolymers, chlorinated polyvinylchlorides, polyamides, polyetherimides, polyethersulfones, nylons, ethylene propylene rubber, ethylene propylene diene rubber, cellulosics and the like. Preferably, the substrate layer is a polyester, polycarbonate, polyvinyl chloride polymer or copolymer, chlorinated polyvinylchloride, polyamide, polyetherimide or polyethersulfone. More preferably, the substrate layer is a polyester or a polycarbonate because of the manufacturing and physical property compatibility of these materials to the 2,2,4,4-tetramethyl-1,3-cyclobutanediol-based polycarbonate.

The polyesters useful as substrate layers for the UV stabilized structures are not restricted in any way. They include polyesters or copolyesters and can be made from a variety of diacids and glycols. They may also contain hydroxyacids if desired. Suitable diacids include, for example, terephthalic acid, isophthalic acid, adipic acid, 1,4-cyclohexanedicarboxylic acid, naphthalenedicarboxylic acid, and the like. Suitable glycols include, for example, ethylene glycol, diethylene glycol, 1,3-propanediol, 1,4-butanediol, 1,4-cyclohexane-dimethanol, 2,2,4,4-tetramethyl-1,3,-cyclobutanediol, 2,2-dimethyl-1,3-propanediol, bisphenol A, hydroquinone, and the like. The only real restriction on the polyesters or copolyesters to be used as substrates is that they be fit for use in their intended application, such as having, for example, the transparency or heat resistance appropriate to the application.

Particularly, suitable polyesters for use as the substrate layer of the present invention are polyethylene terephthalate (PET) or any of its copolymers, mainly due to commercial availability thereof. Copolymers suitable for use may be prepared from PET modified with any of the above diacids and glycols. The polyester resins useful in the invention are well known and are commercially available. Methods for their preparation are described, for example, in U.S. Pat. No. 2,465,319 and U.S. Pat. No. 3,047,539.

The polycarbonates useful as the substrate layer may be prepared from any diphenol or mixture of diphenols. Preferably, the polycarbonate is chosen from bisphenol A polycarbonate or derivatives and/or copolymers thereof. Examples of the derivatives include 3,3',5,5'-tetramethyl bisphenol A polycarbonate and 3,3',5,5'-tetrabromo bisphenol A polycarbonate. The bisphenol A may be substituted with any aryl or alkyl groups which do not interfere with the production of the final polycarbonate and are generally tetra-substituted with the substituents being ortho to the phenolic —OH groups. Preferred polycarbonates are the parent bisphenol A polycarbonate and its copolymers with other bisphenols such as those described above. Methods of preparing the polycarbonates are well known in the art.

The polyvinyl chloride useful as a substrate layer is prepared from vinyl chloride using a suitable polymerization initiator. It may contain comonomers and may also be mixed with plasticizers, such as the dialkyl esters of phthalic acid, and other additives.

In the UV stabilized structure of the present invention, the UV protective layer of the 2,2,4,4-tetramethyl-1,3-cyclobutanediol-based polycarbonate and UV absorbing compound can be of any desired thickness. From a practical standpoint, the thickness of the UV protective layer should not be less than about 0.5 mils (12 microns) and should not be more than about 20 mils (500 microns). A UV protective layer of less than about 0.5 mil (12 microns) in thickness will be difficult to control in a production setting, while a layer of more than about 20 mils (500 microns) will tend to be uneconomical in most constructions. The preferred layer thickness will be in the range of about 0.5 mils (12 microns) to about 5 mils (125 microns) with about 1 mil (25 microns) to about 3 mils (75 microns) being most preferred. The important point is that a sufficiently thick layer must be deposited which contains the effective UV absorbing compound to render the structure weathering resistant.

The methods of preparation of the UV stabilized structure to deposit the UV protective layer on the substrate layer are many and well know in this art. For example, the UV stabilized structures can be prepared by co-extrusion, extrusion lamination or hot press lamination. They can be further prepared by solvent coating of the UV protective layer or by solvent bonding of the UV protective layer onto the substrate layer if desired. In addition, suitable adhesives can also be used such as urethane-based ones should even more permanent bonding be needed.

In particular when using polyester or polycarbonate for the substrate layer, the compatibility of the UV protective layer with the substrate layer results in firm adhesion between the layers and so makes for a durable construction. Additionally, the UV protective layer, because it primarily contains the 2,2,4,4-tetramethyl-1,3-cyclobutanediol-based polycarbonate, is capable of being solvent bonded or thermally bonded. Such bonding techniques result in excellent adhesion of the UV protective layer to polyesters and polycarbonates, thus forming a permanent construction. This is true even in hot and humid conditions.

As used herein, the term "polyester" collectively refers to polyesters and copolyesters, and the term "polycarbonate" collectively refers to polycarbonates and copolycarbonates. The term 2,2,4,4-tetramethyl-1,3,-cyclobutanediol-based polycarbonate is refers to the polycarbonate of 2,2,4,4-tetramethyl-1,3,-cyclobutanediol and also copolycarbonates obtained by use of a modifying glycol such as described above. All references cited above are herein incorporated by reference.

This invention can be further illustrated by the following examples of preferred embodiments thereof, but it will be understood that these examples are included merely for purposes of illustration and are not intended to limit the scope of the invention and that variations and modifications can be effected within the spirit and scope of the invention.

EXAMPLES

UVCON testing as reported herein consisted of exposure in a UVCON machine manufactured by Atlas Electric Devices Co., and equipped with 313B bulbs. The black panel temperature of exposure was 70° C. and the condensation cycle was 40° C. The lights were on for 8 hours followed by 4 hours of no light in the condensation cycle operated according to ASTM G154-97. Impact strength was measured by use of the ASTM chip impact method (ASTM D4508-93) with the exception that the clamping device for the test specimen was the same as that used for the Izod test method (ASTM D256) with clamping jaws modified appropriately to hold the specimen in the chip impact orientation. All impacts were conducted with the exposed sample surface facing the hammer so as to put it in extension during the impact event. Color measurements were taken according to CIE recommendations using a HunterLab Ultrascan instrument employing a D65 light source with a 10° C. observation angle and specular included mode on the instrument. All samples were run in duplicate unless otherwise noted and the results averaged.

Example 1

This example illustrates one embodiment of the UV stabilized structure of the present invention. A polycarbonate of 2,2,4,4-tetramethyl-1,3-cyclobutanediol was prepared to an inherent viscosity (IV) of 0.6 dL/g (0. 25 wt. % in 60:40 phenol:1,1,2,2-tetrachloroethane). The polycarbonate was dissolved in methylene chloride and sufficient bis[2-hydroxy-5-t-octyl-3-(benzotriazol-2-yl)phenyl]methane (available under the trade name Mixxim BB-100 from Fairmont Chemical Company of Newark N.J.) added to give 3 wt. % of this dimeric benzotriazole based on the weight of the polycarbonate plus UV absorbing compound. This solution was evaporated and the resultant material granulated. The granulate was dissolved in trifluoromethylbenzene at a concentration of 5 wt. % and the solution coated onto 3 mm thick plaques cut from sheeting of a copolymer of poly (ethylene terephthalate) modified with 31 mol. % 1,4-cyclohexanedimethanol. The plaques were exposed in a UVCON machine for 1536 hours and the color and haze measured at each 384-hour increment of exposure. The b* value of the color was unchanged from the initially prepared plaques as was the haze of the sample. At the final exposure, impact strength was measured and found to have been retained from the initial material.

Example 2

This example illustrates that without the UV absorbing compound present the color and physical property retention of the copolymer coated with only the 2,2,4,4-tetramethyl-1,3,-cyclobutanediol-based polycarbonate is not achieved. The same construction as detailed in Example 1 was prepared with the UV absorbing compound omitted. The b* value of the plaque rose rapidly with exposure time reaching more than 5 b* units above the initial value in the first exposure interval of 384 hours. Additionally, at the end of the test, the haze value was much higher than the original plaques and the flatwise impact strength test showed the material to be very brittle.

Example 3

This example illustrates another embodiment of the present invention. The 2,2,4,4-tetramethyl-1,3,-cyclobutanediol-based polycarbonate prepared in Example 1 and containing the dimeric benzotriazole compound was pressed into films of from 2 mils (50 microns) to 5 mils (125 microns) thick. These films were then extrusion laminated to the copolyester of Example 1. The copolyester extrusion was conducted at 240° C. set points for all heating zones of the extruder barrel (2.5 inch diameter screw), die adapter and die. The test plaques were cut out and subjected to exposure in a UVCON device. The initial b* value and final b* value after 1536 hours of exposure in the UVCON device were 0.99 and —0.16 respectively (average of four different samples). This slight decrease was acceptable because it was not of sufficient magnitude to be really noticed by an observer in this low color area. Initial haze was 2.08% and final haze was 2.38% (average of four different samples). Sample surface gloss was also very high as with the initial sample. The test plaques were still ductile when impacted.

Example 4

This example illustrates yet another embodiment of the present invention. The polycarbonate films from Example 3 were coated with a thin coating of a urethane adhesive (Hauthane HD-2001 from C.L. Hauthaway and Sons Corp.) They were allowed to air dry for several hours and then were extrusion laminated to the copolyester of Example 1. Test plaques were cut and subjected to UVCON exposure as in the other examples. The b* value, haze, surface gloss and impact strength of the plaques was observed to be essentially the same as for the unexposed specimens as noted also in Examples 1 and 3.

Example 5

This example illustrates the practice of this invention using a polycarbonate substrate beneath the UV protective layer. Films of the UV protective layer as detailed in Example 3 are pressed onto sheets of bisphenol A polycarbonate at 150° C. for a period of 30 sec. The cooled plates were tested in a UVCON device against controls of 1) the bisphenol A polycarbonate itself and 2) a coextrusion of bisphenol A polycarbonate which had a 125 micron thick layer that contained more than 5 wt% of a benzotriazole-type UV absorber (this is commercial sheeting from Sheffield Plastics, Inc. with the tradename of Hyzod). After exposure for 1536 hrs, the following color changes in b* were noted along with changes in surface appearance:

| Material | change in b* | surface appearance |
| --- | --- | --- |
| Control 1 | 16.45 | dull |
| Control 2 | 3.00 | glossy |
| Ex. 5 Structure | 0.65 | glossy |

As evident from the data above, the Ex. 5 Structure of the invention has a better combination of surface gloss retention and also better control of discoloration than even the coextruded polycarbonate sheet of Control 2.

Thus, the present invention is a superior multi-layered structure that has long term weatherability to UV degradation and improved impact resistance. The 2,2,4,4-tetramethyl-1,3-cyclobutanediol-based polycarbonate provides (i) UV stability not only in the substrate layer but also in the UV protective layer and (ii) increased impact resistance in the UV protective layer compared to that of acrylic materials. Further, when used in combination with a polycarbonate or polyester substrate layer, the 2,2,4,4-tetramethyl-1,3-cyclobutanediol-based polycarbonate in the UV protective layer promotes superior adhesion resulting in reduced delamination.

I claim:

1. An ultraviolet stabilized structure comprising:

(a) an ultraviolet protective layer comprising a 2,2,4,4-tetramethyl-1,3-cyclobutanediol-based polycarbonate and an ultraviolet absorbing compound selected from the group consisting of a benzotriazole, a dimeric benzotriazole, a triazine, a benzoxazinone, and a diphenylcyanoacrylate; and (b) a substrate layer comprising a polymer which degrades upon exposure to ultraviolet radiation.

2. The structure of claim 1 wherein the 2,2,4,4-tetramethyl-1,3-cyclobutanediol-based polycarbonate comprises an acid component of 100 mole percent carbonic acid residues and a diol component of at least about 70 mole percent 2,2,4,4-tetramethyl-1,3-cyclobutanediol.

3. The structure of claim 1 wherein the 2,2,4,4-tetramethyl-1,3-cyclobutanediol-based polycarbonate comprises an acid component of 100 mole percent carbonic acid residues and a diol component of at least about 80 mole percent 2,2,4,4-tetramethyl-1,3-cyclobutanediol.

4. The structure of claim 2 wherein the diol component further comprises up to about 30 mole percent modifying glycols containing at least four carbon atoms.

5. The structure of claim 4 wherein the modifying glycols are cycloaliphatic glycols.

6. The structure of claim 4 wherein the modifying glycols are selected from 1,4-cyclohexanedimethanol and 2,2-dimethyl-1,3-propanediol.

7. The structure of claim 4 wherein the modifying glycol is 1,4-cyclohexanedimethanol, and the 2,2,4,4-tetramethyl-1,3-cyclobutanediol and 1,4-cyclobutanediol are used in their cis-isomer form of about 40 to about 80 percent in the preparation of the 2,2,4,4-tetramethyl-1,3-cyclobutanediol-based polycarbonate.

8. The structure of claim 1 wherein the benzotriazole comprises a phenolic residue containing at least a methyl group.

9. The structure of claim 1 wherein the benzotriazole comprises a phenolic residue containing a higher alkyl group than methyl.

10. The structure of claim 1 wherein the benzotriazole compound has the general chemical structure:

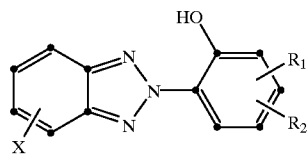

wherein X is an alkyl group, aryl group, or halogen and wherein $R_1$ and $R_2$ are hydrogen or alkyl or aryl groups having from 1 to 20 carbon atoms.

11. The structure of claim 1 wherein the benzotriazole compound has the general chemical structure:

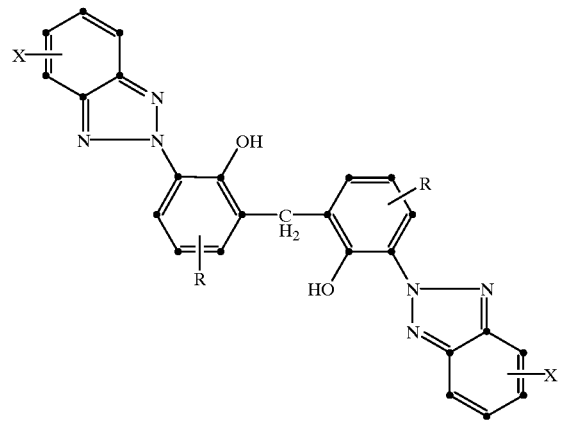

wherein X is an alkyl group, aryl group or halogen, and wherein $R_1$ and $R_2$ are alkyl or aryl groups having from 1 to 20 carbon atoms.

12. The structure of claim 1 wherein the dimeric benzotriazole has a —CH₂— linkage between phenolic rings of two benzotriazole molecules.

13. The structure of claim 1 wherein the triazine is substituted on all three carbon atoms of the triazine ring with up to three phenolic groups and on the remaining carbon atoms with aryl groups containing no phenolic hydroxyl groups.

14. The structure of claim 1 wherein the triazine compound has the general chemical structure:

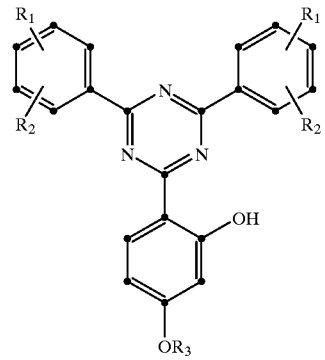

wherein $R_1$ and $R_2$ are hydrogen, an alkyl group or aryl group and $R_3$ is an alkyl or aryl group.

15. The structure of claim 1 wherein the benzoazinoine has an aromatic ring between two benzoxazinone rings.

16. The structure of claim 15 wherein the benzoxazinone rings are substituted with alkyl or halogen substituents.

17. The structure of claim 1 wherein the benzoxazinone compound has the general chemical structure:

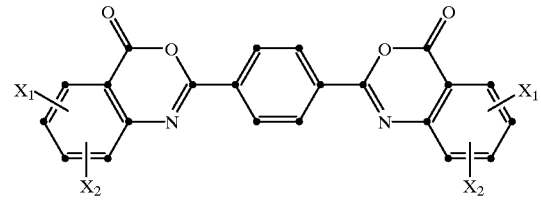

wherein $X_1$ and $X_2$ are selected from the group consisting of hydrogen, alkyl, aryl, heteroaryl, halo, alkoxy, aryloxy, hydroxy, carboxy, ester and nitro.

18. The structure of claim 1 wherein the diphenylcyanoacrylate compound has the general chemical structure:

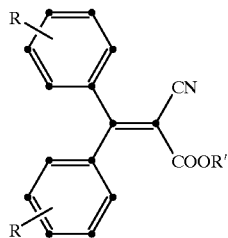

wherein R is an alkyl or aryl group having from 1 to 20 carbons and R' is an alkyl group having from 1 to 20 carbons.

19. The structure of claim 18 wherein R contains a functional group selected from the group consisting of carbomethoxy, hydroxy, an acid group or an ester group.

20. The structure of claim 1 wherein the polymer of the substrate layer is selected from a polyester, polycarbonate, polyvinyl chloride polymer or copolymer, chlorinated polyvinylchloride, polyamide, polyetherimide, polyethersulfone, nylon, ethylene propylene rubber, ethylene propylene diene rubber, and cellulosic.

21. The structure of claim 1 wherein the polymer of the substrate layer is selected from a polyester, polycarbonate, polyvinyl chloride polymer or copolymer, chlorinated polyvinylchloride, polyamide, polyetherimide, and polyethersulfone.

22. The structure of claim 1 wherein the polymer of the substrate layer is selected from a polyester or polycarbonate.

23. The structure of claim 1 wherein the ultraviolet absorbing compound is present in the ultraviolet protective layer from about 0.25 to about 5 weight percent, based on the total weight percent of the ultraviolet absorbing compound and the 2,2,4,4-tetramethyl-1,3-cyclobutanediol-based polycarbonate.

24. The structure of claim 1 wherein the ultraviolet absorbing compound is present in the ultraviolet protective layer in an amount sufficient to absorb at least 99 percent of the light in the damaging ultraviolet region.

25. The structure of claim 1 wherein the ultraviolet protective layer has a thickness of about 0.5 mils (12 microns) to about 20 mils (500 microns).

26. The structure of claim 1 wherein the ultraviolet protective layer has a thickness of about 0.5 mils (12 microns) to about 5 mils (125 microns).

27. The structure of claim 1 wherein the ultraviolet protective layer has a thickness of about 1.0 mils (25 microns) to about 3 mils (75 microns).

* * * * *